United States Patent [19]
Yamasaki et al.

[11] Patent Number: 5,995,561
[45] Date of Patent: Nov. 30, 1999

[54] METHOD AND APPARATUS FOR REDUCING NOISE CORRELATION IN A PARTIAL RESPONSE CHANNEL

[75] Inventors: Richard G. Yamasaki, Torrance, Calif.; Ryohei Kuki, Tokyo, Japan; Ho-Ming Lin, Irvine; Craig Tammel, Balboa Island, both of Calif.

[73] Assignee: Silicon Systems, Inc., Tustin, Calif.

[21] Appl. No.: 08/632,348

[22] Filed: Apr. 10, 1996

[51] Int. Cl.$^6$ .................................................. H04L 27/06
[52] U.S. Cl. .......................... 375/341; 341/59; 371/43.1; 375/340
[58] Field of Search ..................... 364/724.011, 724.012, 364/724.16, 724.19, 724.17, 724.2, 728.07; 371/43.1, 43.3, 43.4; 375/229–233, 253, 340, 341; 341/59

[56] References Cited

U.S. PATENT DOCUMENTS

| | | | |
|---|---|---|---|
| 4,945,538 | 7/1990 | Patel | 341/43 |
| 5,311,178 | 5/1994 | Pan et al. | 341/59 |
| 5,546,430 | 8/1996 | Liao et al. | 375/341 |
| 5,572,621 | 11/1996 | Martin | 395/2.36 |

OTHER PUBLICATIONS

G. David Forney, Jr., "Maximum–Likelihood Sequence Estimation of Digital Sequences in the Presence of Intersymbol Interference," *IEEE Transactions on Information Theory*, vol. IT–18, pp. 363—3378, May 1972.

Arvind M. Patel, "A New Digital Signal Processing Channel for Data Storage Products," *Digest of the Magnetic Recording Conference*, pp. E6–E7, Jun. 1991.

Arvind M. Patel, "Performance Data for a Six–Sample Look Ahead (1,7) ML Detection Channel," *IEEE Transactions on Magnetics*, vol. 29, No. 6, pp. 4012–4014, Nov. 1993.

Roger G. Wood and David A. Peterson, "Viterbi Detection of Class IV Partial Response on a Magnetic Recording Channel," *IEEE Transactions on Communications*, vol. COM–34. pp. 454–461, May 1986.

Wozencraft & Jacobs, "Principles of Communication Engineering", Chapter 4, pp. 248–263, Jun. 1965.

*Primary Examiner*—Stephen Chin
*Assistant Examiner*—Joseph Roundtree
*Attorney, Agent, or Firm*—W. Daniel Swayze, Jr.; Wade James Brady, III; Richard L. Donaldson

[57] ABSTRACT

A method and apparatus for reducing noise correlation in a partial response channel through optimization of a look-ahead maximum likelihood (ML) detector. In the method of the present invention, the ML detector is optimized in light of the noise correlation generated by the partial response channel. The improved ML detector provides comparable performance to, or better performance than, a Viterbi detector in the presence of colored noise. In the present invention, a set of finite impulse response (FIR) transversal filters are used as the ML estimator for the look-ahead detector. The weighted sum outputs of the FIR filters are compared to a set of thresholds based on previously detected data to make the decision for current detection. The present invention improves the ML detector's performance and reduces its complexity by optimizing the coefficients of the FIR filters in the presence of the correlated or colored noise. The SNR (signal-to-noise ratio) of each FIR filter is determined for a range of coefficients based on the noise autocorrelation of the channel for a given user density, and the coefficients providing the highest SNR are selected for each decision function. The result is a noise whitening ML detector providing improved performance and lower complexity than prior art ML detectors.

11 Claims, 9 Drawing Sheets

| Positive Phase | | | | |
|---|---|---|---|---|
| Function of Look-Ahead Sample Values | Nominal Thresholds at State | | | Decision Variable |
| | 0000 | 1000 | 1100 | |
| Baseline Check $Fa = y_1+y_2$ | $Fa > 2.5$ | $Fa > 2.5$ | $Fa > 1.5$ | A |
| Peak Check $Fx = 0.5y_0+y_1-y_3$ $Fy = 0.5y_0+y_1-y_3$ $Fw = 0.5y_0+y_1+0.5y_2-0.5y_3+y_4$ | $Fx > 0.25$ $Fy > 1.25$ $Fw > 1.50$ | $Fx > -0.25$ $Fy > 0.75$ $Fw > 1.00$ | $Fx > -2.25$ $Fy > -1.25$ $Fw > -1.00$ | X Y W |
| Negative Phase | | | | |
| | Nominal Thresholds at State | | | |
| | 1111 | 0111 | 0011 | |
| Baseline Check $Fa = y_1+y_2$ | $Fa < -2.5$ | $Fa < -2.5$ | $Fa < -1.5$ | A |
| Peak Check $Fx = 0.5y_0+y_1-y_3$ $Fy = 0.5y_0+y_1-y_3$ $Fw = 0.5y_0+y_1+0.5y_2-0.5y_3+y_4$ | $Fx < -0.25$ $Fy < -1.25$ $Fw < -1.50$ | $Fx < 0.25$ $Fy < -0.75$ $Fw < -1.00$ | $Fx < 2.25$ $Fy < 1.25$ $Fw < 1.00$ | X Y W |

FIGURE 5

| Current State $a_0b_0c_0d_0$ | Sample Value/Next State/Decoded Data | |
|---|---|---|
| | A&X&(Y+W) = 0 | A&X&(Y+W) = 1 |
| Positive Phase | | |
| 0 0 0 0 | 0/0000/0 | +1/0001/1 |
| 1 0 0 0 | -1/0000/0 | 0/0001/1 |
| 1 1 0 0 | -3/1000/0 | -2/1001/1 |
| 0 0 0 1 | +3/0011/0 | |
| 1 0 0 1 | +2/0011/0 | |
| Negative Phase | | |
| 1 1 1 1 | 0/1111/0 | -1/1110/1 |
| 0 1 1 1 | +1/1111/0 | 0/1110/1 |
| 0 0 1 1 | +3/0111/0 | +2/0110/1 |
| 1 1 1 0 | -3/1100/0 | |
| 0 1 1 0 | -2/1100/0 | |

FIGURE 6

| Colored Noise S/N Gain | User Density, Du | | | | | |
|---|---|---|---|---|---|---|
| Detector Type | 0 | 1.0 | 1.5 | 2.0 | 2.5 | 3.0 |
| Ideal Viterbi | 10 | 7.76 | 7.88 | 8.20 | 8.59 | 9.09 |
| I. 5 Sample, 3 Equation<br>$F_x = F_y = 0.5y_0+y_1-y_3$<br>$F_w = 0.5y_0+y_1-0.5y_3+y_4$ | ---- | 7.75 | 7.40 | 7.13 | 7.04 | 7.43 |
| II. 5 Sample, 3 Equation<br>$F_x = F_y = 0.5y_0+y_1-y_3$<br>$F_w = 0.5y_0+y_1+0.5y_2-0.5y_3+y_4$ | ---- | 7.89 | 7.64 | 7.69 | 7.66 | 7.40 |
| III. 5 Sample, 3 Equation<br>$F_x = F_y = 0.8y_0+0.6y_1+0.5y_2-y_3$<br>$F_w = 0.8y_0+y_1+0.7y_2-0.5y_3+y_4$ | ---- | 7.25 | 7.54 | 7.96 | 8.33 | 8.44 |
| IV. 5 Sample, 3 Equation<br>$F_x = F_y = 0.4y_{M1}+0.4y_0+0.7y_1+0.2y_2-0.5y_3$<br>$F_w = 0.5y_{M1}+0.5y_0+0.9y_1+0.6y_2-0.1y_3+0.7y_4$ | ---- | ---- | 7.44[1] | 8.29[1] | 9.18[1] | 9.75[1] |
| V. 5 Sample, 4 Equation<br>$F_x = F_y = 0.75y_0+y_1-y_3-0.75y_4$<br>$F_w = y_0+0.75y_1+y_2-0.5y_3+y_4$<br>$F_v = y_0+0.5y_1+0.75y_2-y_3+0.5y_4$ | ---- | ---- | 7.76[1]<br>7.81[2] | 8.20[1]<br>8.20[2] | 8.65[1]<br>8.90[2] | 8.96[1]<br>10.14[2] |
| VI. 6 Sample, 4 Equation<br>$F_x = F_y = F_z = 0.75y_0+y_1-y_3-0.75y_4$<br>$F_w = y_0+0.75y_1+y_2-y_3+y_4$<br>$F_v = 0.75y_0+y_1+0.5y_2-0.25y_3+0.25y_4+y_5$ | ---- | ---- | ---- | 8.20[1]<br>8.20[2] | 8.65[1]<br>9.54[2] | ----<br>10.90[2] |

1. Optimized for Du=2.0
2. Optimized at each Du
($F_a = y_1+y_2$, for all above cases)

FIGURE 7

METHOD AND APPARATUS FOR REDUCING NOISE CORRELATION IN A PARTIAL RESPONSE CHANNEL

BACKGROUND OF THE INVENTION

1. Field of the Invention

The present invention relates to the field of signal processing in a channel, and, in particular, to signal processing in a partial response channel.

2. Background

In magnetic recording devices, such as magnetic disks and tapes, a recording head is used to read and write information to and from a magnetic surface. In a typical rotating medium-based storage system, data is stored on magnetic disks in a series of concentric "tracks." These tracks are accessed by a read/write head that detects variations in the magnetic orientation of the disk surface. The read/write head moves back and forth radially on the disk under control of a head-positioning servo mechanism so that it can be selectively positioned over a selected one of the tracks. Once in position over a track, the servo mechanism causes the head to trace a path that follows the center line of the selected track.

Generally, the inductive recording head consists of a slit toroid made up of high permeability magnetic material and wound by several conductor turns. The toroid contains a gap which is positioned over the data tracks on the magnetic recording surface. To record, a current is generated through the conductor windings, altering the magnetic field in the toroid. At the location of the gap, the amplitude of the magnetic field is large enough to record on the magnetic material of the storage device to a sufficient depth. The amplitude of the magnetic field falls off sharply away from the gap.

By manipulating the current through the conductor windings, the magnitude and direction of the magnetic flux at the location of the gap can be modulated in such a fashion as to encode information into the magnetic surface of the storage device. A pattern of external and internal fields are created as the head and recording surface are moved relative to each other. These patterns are similar to a series of bar magnets of changing polarities. The polarity transitions are then readable as transitions in the magnetic flux at the recording surface. In read mode, as the magnetic storage surface moves across the gap in the head, the magnetic field of the storage surface is detected at the gap, and a voltage is induced in the coil proportional to the rate of change of the flux. The read channel then processes this analog voltage signal, typically converting the flux transitions into a series of pulses, and converts the analog signal into digital data.

Magnetic storage devices sometimes use analog peak detection to process incoming read signals. However, as recording density, or "user density" (Du), increases the analog peak detection scheme becomes unreliable because of the large amount of inter-symbol interference (ISI) between adjacent pulses. Alternatively, a partial response maximum likelihood (PRML) channel can be used to increase the user density. However, this method requires very good equalization of the read signal to shape the read signal into the desired partial response (PR) target waveform.

User density ($D_u$) is a measure of how the pulse width relates to the data rate in the form of a ratio of the analog signal pulse-width at 50% magnitude over the length of the data period. A higher user density means that signal pulses resulting from read transitions are spread over a larger number of clock cycles, increasing the interaction or overlap of adjacent pulses, and resulting in greater ISI.

A partial response channel does not remove ISI from the channel signal. Instead, the signal is equalized to provide a target pulse waveform having predefined values at specific sampling instants. The effects of ISI on the target pulse waveform are predicted and incorporated into a pulse detection scheme which determines the occurrence of a signal pulse based on the sample history of the waveform and model waveform prediction. The history of the sample waveform is matched to a set of model waveforms, and the most likely model waveform is used to decode the signal into binary data. Hence, it is often referred to as "maximum likelihood" detection.

Partial response channels are therefore more robust than analog peak detectors in the presence of ISI. However, as described below, a problem exists in PR channels due to the equalization required to generate the target pulse waveform, as well as the process used to generate a signal metric for determining the most likely waveform. The PR equalizer and ML estimator used to generate the signal metric each serve to correlate noise in the channel. As a result, ML detector performance is impaired by a reduction in signal-to-noise gain.

The most commonly used maximum likelihood (ML) detector is the Viterbi detector, which is optimized for detection of signals in the presence of white noise. It is, however, somewhat complicated to implement especially for higher orders of PR channels (e.g. EPR4, EEPR4) and very inefficient for parallel/pipeline implementation architectures. Furthermore, its performance degrades as the noise become correlated. Look-ahead ML detector hardware requirements are usually less than that for a Viterbi detector, and look-ahead detectors are more suitable for parallel/pipeline implementation. However, the performance of look-ahead ML detectors is usually inferior to a Viterbi detector.

Look-ahead detectors are described in A. M. Patel's article "A New Digital Signal Processing Channel of Data Storage Products," *Digest of the Magnetic Recording Conference*, June 1991, pp. E6–E7; in A. M. Patel, et al., "Performance Data for a Six-Sample Look-Ahead (1.7) ML Detection Channel," *IEEE Transactions on Magnetics*, vol. 29, no. 6, pp. 4012–4014, November 1993; and in Patel's U.S. Pat. No. 4,945,538. A look-ahead detector is also described in U.S. Pat. No. 5,311,178 to T. Pan and R. G. Yamasaki.

The Patel and Pan/Yamasaki channels use partial response signaling to limit the number of isolated pulse non-zero samples. The Patel channel is equalized to EPR4 with three non-zero samples, and the Pan/Yamasaki channel is equalized to EEPR4 (or $E^2PR4$) where the four non-zero samples, $\alpha$, $\beta$, $\beta$ and $\alpha$, are 1, 3, 3 and 1, respectively. Both channels use the (1,7) RLL code to simplify signal detection.

Run-length limited (RLL) codes are useful because they place upper and lower bounds on the number of clock cycles occurring between transitions. The upper bound is very important because clock recovery is based on the occurrence of these transitions. For example, a long train of zeros in a data sequence produces no transitions and the clock recovery circuit has no input pulse with which to synchronize its tracking. In this situation, the data recovery timing might drift out of phase. RLL codes ensure that sufficient transitions occur for the clock recovery circuit to maintain the correct timing phase and frequency. Also, by maintaining the lower bound on the number of zeros between consecutive ones, signal pulses in the read channel are separated to reduce the intersymbol interference (ISI) caused by interaction between adjacent signal pulses.

The (1,7) RLL code is characterized by a minimum of one "0" and a maximum of seven "0's" between consecutive "1's". In the modified non-return-to-zero (NRZI) format, where each "1" is represented by a transition, and each "0" is represented by the lack of a transition, the (1,7) RLL code is sufficient for clock recovery purposes. Further, by maintaining the minimum of one "0" between consecutive "1's", transitions are separated so as to be differentiable from one another.

FIG. 1 illustrates, with solid curve 100, an isolated Lorentzian pulse equalized and sampled for EEPR4, and a minimum distance error event shown as a dashed curve 101. The pulse is the result of applying a positive unit step transition, e.g. a transition from a magnetic read head, to a $(1-D)(1+D)^3$ channel (EEPR4). The circles on solid waveform 100 show the isolated pulse samples for EEPR4. Samples of minimum distance error event 101 are indicated by diamonds. Minimum distance error event 101 is equivalent to the isolated pulse (100) shifted by one code period in time.

In most ML detectors, including the Viterbi detector, the square of the Euclidean distance between two sequences is often used as the signal metric. The Euclidean distance is defined as the square root of the sum of the squared error terms between two waveforms at each sampling instant. The squared Euclidean distance error of a sample combination is defined as:

$$E^2 = (y_0 - ya)^2 + (y_1 - yb)^2 + (y_2 - yc)^2 + (y_3 - yd)^2 + (y_4 - ye)^2 \quad [1]$$

$$= \sum_{i=0}^{k} d_i^2$$

where ya, yb, yc, yd and ye are the expected values for the model waveform; $y_0$, $y_1$, $y_2$, $y_3$ and $y_4$ are consecutive sample values; and $d_i$ is the sample error at $y_i$.

In FIG. 1, the isolated pulse waveform 100 and the minimum distance error event 101 have sample errors of values 0, 1, 2, 0, 2 and 1 for samples $y_{M1}$, $y_0$, $y_1$, $y_2$, $y_3$ and $y_4$, respectively, where $y_{M1}$ is referred to as a look-back sample. The squared Euclidean distance between sampled waveform 100 and the minimum distance error event 101 is labeled $d_{MIN}^2$. $d_{MIN}^2$ is equal to the sum of the squares of these values, which adds up to a value of 10.

In the ML detector of U.S. Pat. No. 5,311,178, thresholds for each decision function are determined by minimizing the error between an expected sample model waveform and the nearest valid sample model waveform. For this reason, the thresholds for each function are dependent on the present state, as the next valid states are determined by the present state.

In the calculation of the Euclidean distance for use as a signal metric, for a first model waveform to be selected over a second model waveform, $$E_1^2 - E_2^2 < 0 \quad [2]$$

where $E_1^2$ is the squared Euclidean distance between the first model waveform and the sampled signal, and $E_2^2$ is the squared Euclidean distance between the second model waveform and the sampled signal. The squared terms of the sampled signal are canceled out to yield a linear decision function. This will generate the following threshold decision:

$$(ya_2-ya_1)y_0+(yb_2-yb_1)y_1+(yc_2-yc_1)y_2+(yd_2-yd_1)y_3+(ye_2-ye_1)y_4 < (ya_2-ya_1)(ya_2+ya_1)+\ldots+(ye_2-ye_1)(ye_2+ye_1) \quad [3]$$

where $y_0$, $y_1$, $y_2$, $y_3$ and $y_4$ are the actual sample values; $ya_1$, $yb_1$, $yc_1$, $yd_1$ and $ye_1$ are the expected values for the first model waveform; and $ya_2$, $yb_2$, $yc_2$, $yd_2$ and $ye_2$ are the expected values for the second model waveform.

For the sample points at which the model waveforms are equal, the products including the factor $(yk_2-yk_1)$, where k is the associated sample point, are canceled. In the negative phase, i.e. for negative transitions, the thresholds are the same, but the inequalities are reversed and the decision functions are multiplied by "–1".

The peak check decision functions from FIG. 5A of U.S. Pat. No. 5,311,178 are shown below for $\alpha=1$ and $\beta=3$. Fw (Fz in the patent) is normalized with a sign change.

a. $Fx=Fy=0.5y_0+y_1-y_3$ [4]

b. $Fw=0.5y_0+y_1-0.5y_3+0.5y_4$ [5]

$y_0$, $y_1$, $y_2$, $y_3$ and $y_4$ are sequential code rate sample values. The linear equations Fx, Fy and Fw have sample values that are multiplied by coefficients which maximize the detection threshold between all possible signal waveform patterns and their minimum distance error waveforms. For example, each decision function (Fx, Fy, etc.) can be represented by the following equation:

$$F(n) = \sum_{i=0}^{k} c_i y(n-1) = c_0 y(n) + c_1 y(n-1) + \ldots + c_k y(n-k) \quad [6]$$

where $c_i$ are the coefficients chosen to maximize detection, and k is the number of samples used in the ML detection scheme.

From equation [6], it can be shown that each decision equation has the same form as an FIR filter. Therefore, the detected noise and the detector noise bandwidth are affected by the decision function. Further, in the prior art, decision functions are designed under the assumption that the noise at the sampled input of the detector is additive white Gaussian noise (AWGN). However, partial response channels comprise filter and equalizer components for shaping the input waveform to the target PR pulse. The PR equalizer, in particular, typically supplies high frequency boost to provide pulse-slimming of the input pulse.

The filter and equalizer components in the PR channel shape the noise of the system in the same manner as the input pulse, thereby coloring, or correlating, the input noise according to the filter and equalizer frequency response functions. The target pulse signal at the input of the detector thus contains a noise component that is no longer white in nature, but has an effective noise bandwidth. For this reason, performance of the decision functions within the detector is reduced due to the correlation of noise. A partial response channel is desired that achieves optimum decision performance in the presence of colored noise.

SUMMARY OF THE PRESENT INVENTION

The present invention provides a method and apparatus for reducing noise correlation in a partial response channel through optimization of a look-ahead maximum likelihood (ML) detector. In the method of the present invention, the ML detector is optimized in light of the noise correlation generated by the partial response channel. The improved ML detector provides comparable performance to, or better performance than, a Viterbi detector in the presence of colored noise.

In the present invention, a set of finite impulse response (FIR) transversal filters are used as the ML estimator for the look-ahead detector. The weighted sum outputs of the FIR filters are compared to a set of thresholds based on previously detected data to make the decision for current detection. The present invention improves the ML detector's performance and reduces its complexity by optimizing the coefficients of the FIR filters in the presence of the correlated or colored noise. For a range of coefficient values, the SNR (signal-to-noise ratio) of each FIR filter is determined based on the noise autocorrelation of the channel for a given user density, and the coefficients providing the highest SNR are selected for each decision function. The result is a noise whitening ML detector providing improved performance with lower complexity than prior art ML detectors.

BRIEF DESCRIPTION OF THE DRAWINGS

FIG. 5 is a decision table for positive and negative phase EEPR4 detection in one embodiment of a five sample look-ahead detector.

FIG. 6 is a state table for a ten state look-ahead ML detector.

FIG. 7 is a signal-to-noise gain table for various ML detectors at varying user densities.

DETAILED DESCRIPTION OF THE PRESENT INVENTION

A method and apparatus for reducing noise correlation in a partial response channel is described. In the following description, numerous specific details, such as EEPR4 channel detection and the variance of the noise power spectrum, are described in order to provide a more thorough description of the invention. It will be apparent, however, to one skilled in the art, that the present invention may be practiced without these specific details. In other instances, well-known features have not been described in detail in order not to unnecessarily obscure the present invention.

Prior art PR channels require complex look-ahead detectors to approach the signal-to-noise gain performance of Viterbi detectors under similar conditions. Thus, in prior art circuits, look-ahead detectors with fewer look-ahead samples are implemented with an associated reduction in performance. Further, prior art ML detectors are predicated on the assumption that noise at the input of the ML detector is additive white Gaussian noise.

The method and apparatus of the present invention implement a look-ahead detector of fewer look-ahead samples (e.g., four to six samples) in which the decision functions are optimized for the presence of colored noise The expected correlation of the noise at the input of the ML detector is determined, and the ML detector is designed to maximize the signal-to-noise gain of each ML decision function in light of the noise variance at the ML estimator output. Performance approaching, and in some cases exceeding, that of a Viterbi detector of the prior art is achieved.

Figure 1:
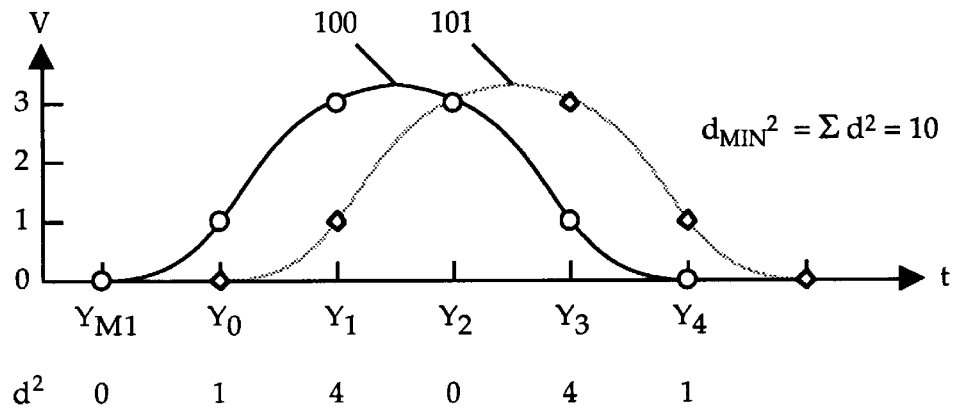
FIG. 1 is a waveform diagram of an isolated EEPR4 pulse with a minimum distance error event.
Figure 2:
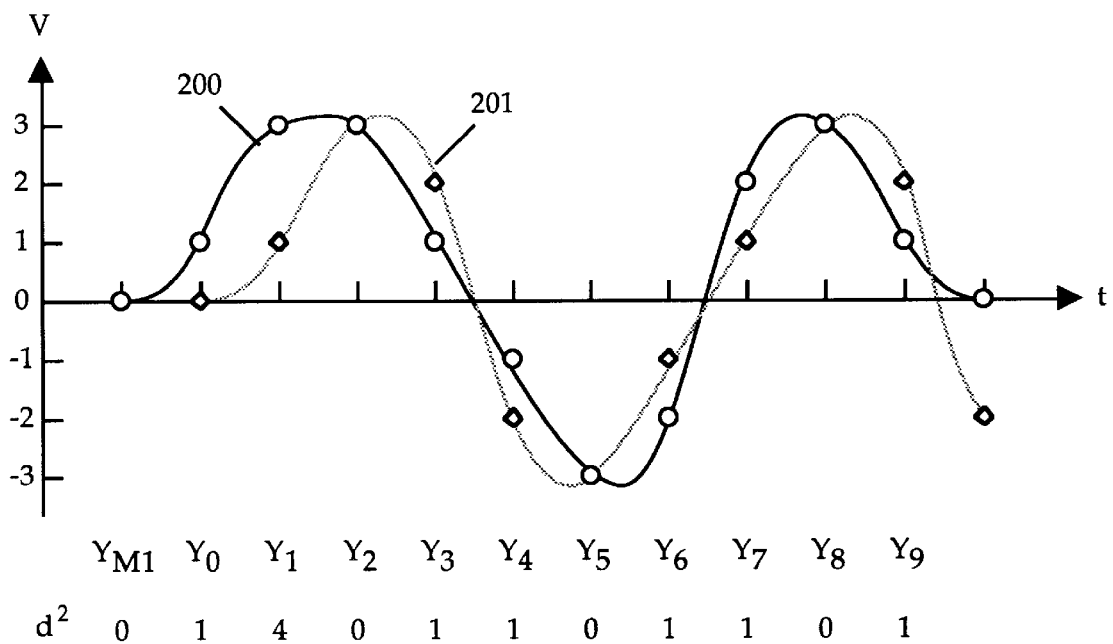
FIG. 2 is a waveform diagram of a sampled worst-case EEPR4 waveform with a minimum distance error event.

FIG. 2 shows a "worst case" signal waveform 200 with the associated minimum distance error event indicated by dashed curve 201. As shown in FIG. 1, $d_{MIN}^2$ (minimum squared distance) for an isolated EEPR4 pulse is equal to ten. However, ten samples ($y_0-y_9$) are required to achieve a reading of $d_{MIN}^2=10$ for the worst case waveform of FIG. 2 due to the effects of ISI on non-isolated pulses. Thus, assuming AWGN (i.e., uncorrelated noise), a ten sample look-ahead detector is required to achieve the maximum detector signal-to-noise (S/N) gain, which is accomplished by maximizing the minimum distance between waveforms.

A ten sample look-ahead detector is much more complex than the prior art four to six sample look-ahead detectors. However for practical user densities ($D_u$), the noise at the detector input is not AWGN, but is correlated (colored) by the frequency boost equalization required to achieve the desired partial response (PR) target pulse signal. Correlation of noise in the channel acts to reduce the actual signal-to-noise gain of detectors operating under the assumption of AWGN. Greater actual signal-to-noise gain is therefore possible with a less complex look-ahead detector when the detector accounts for noise correlation.

Figure 10:
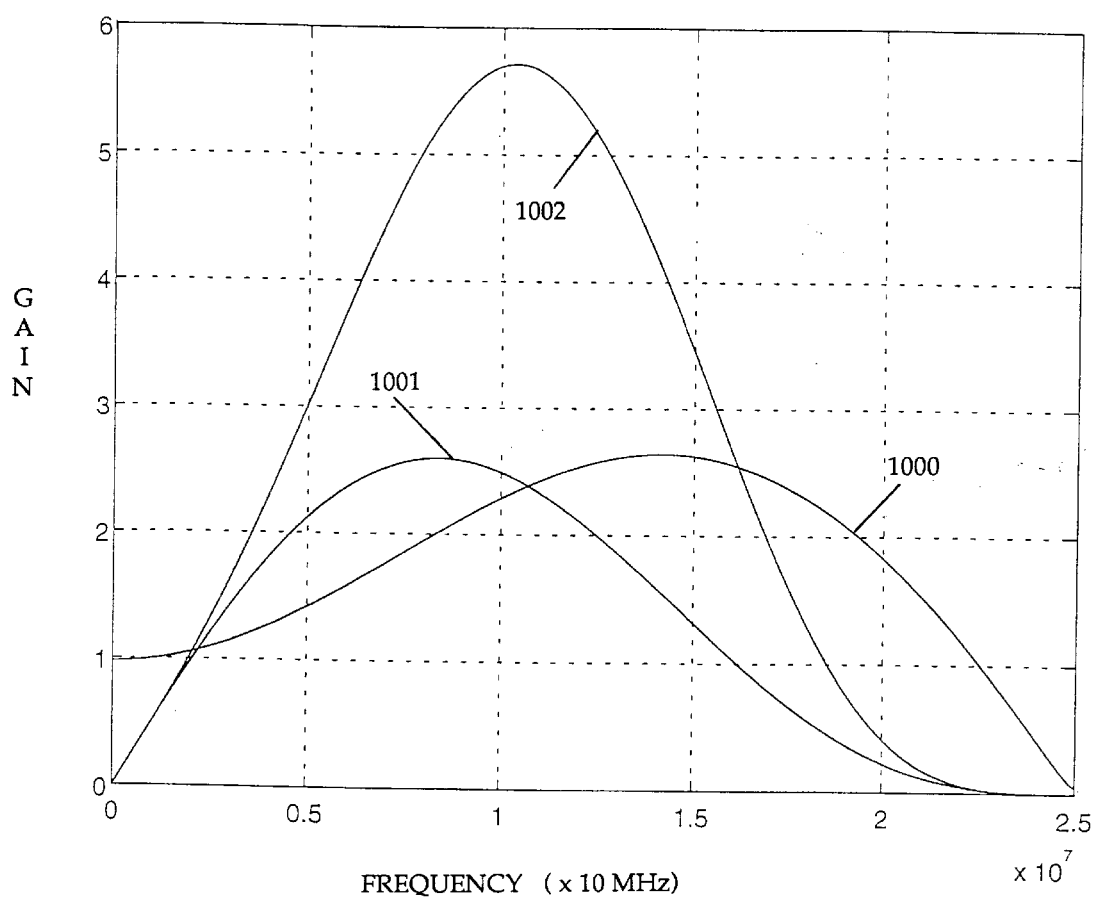
FIG. 10 is a frequency response diagram illustrating the correlating properties of a partial response channel.

The effects of the PR equalizer on the additive channel noise is best illustrated in the frequency domain where the effects on the noise bandwidth can be clearly seen. FIG. 10 is a graph of the frequency responses for a seven-pole equalizer function, a five-sample decision function (FIR filter), and the combined response for the series connection of the equalizer function and the decision function. The horizontal axis represents frequency in tens of megahertz. The vertical axis represents gain.

Curve 1000 is the frequency response for a seven-pole, two-zero filter representing the equalizer for a PR channel. The form of curve 1000 is that of a lowpass filter with high frequency boost. Noise in the PR channel is colored or correlated by this frequency response so that the noise power spectrum takes the shape of the equalizer response where the gain magnitude is squared. Curve 1000 is therefore representative of the noise spectrum at the output of the PR equalizer.

Curve 1001 is the frequency response for a ML estimator decision function having coefficient values of [0.5, 1, 0, -1, -0.5]. Each decision function has an associated frequency response determined by its coefficients. The form of curve 1001 for this example is that of a bandpass filter centered near 7.5 MHz with a reduction in gain in the frequency region corresponding to the high frequency boost of curve 1000. Any signal processed by the ML estimator decision function is shaped by this frequency response, including noise. The form of curve 1001 can therefore be used as a whitening filter with respect to colored noise at the input of the ML estimator.

Curve 1002 is the combined frequency response generated by the PR equalizer and ML estimator in series. The shape of the curve is determined by the product of the magnitudes of curves 1000 and 1001 at each frequency. The noise power spectrum for the PR channel including the PR equalizer and the ML estimator is therefore shaped by the square of the magnitude of curve 1002. For this example, the combined frequency response is a bandpass function with a center frequency near 10 MHz. By altering coefficients of the ML estimator, the effective noise bandwidth associated with the combined frequency response can be reduced. Therefore, the present invention optimizes the coefficients of the ML estimator to reduce the effective noise bandwidth at the ML estimator output, thus whitening or decorrelating the correlated noise component. As the minimum distance error is also dependent on the ML estimator coefficients, decorrelation of noise must be balanced with maintenance of the minimum distance error to achieve the highest signal-to-noise gain.

In the following description, a (1,7) RLL code EEPR4 channel ideally equalized for a series of Lorentzian pulses is used as an example. The invention is described in relation to a (1,7) EEPR4 look-ahead detector embodiment. It will be apparent that the present invention can be applied to other partial response channels as well. Further, a trade-off exists between detector performance and complexity. So as not to obscure the invention, a simpler five sample look-ahead detector will be described.

Figure 4:
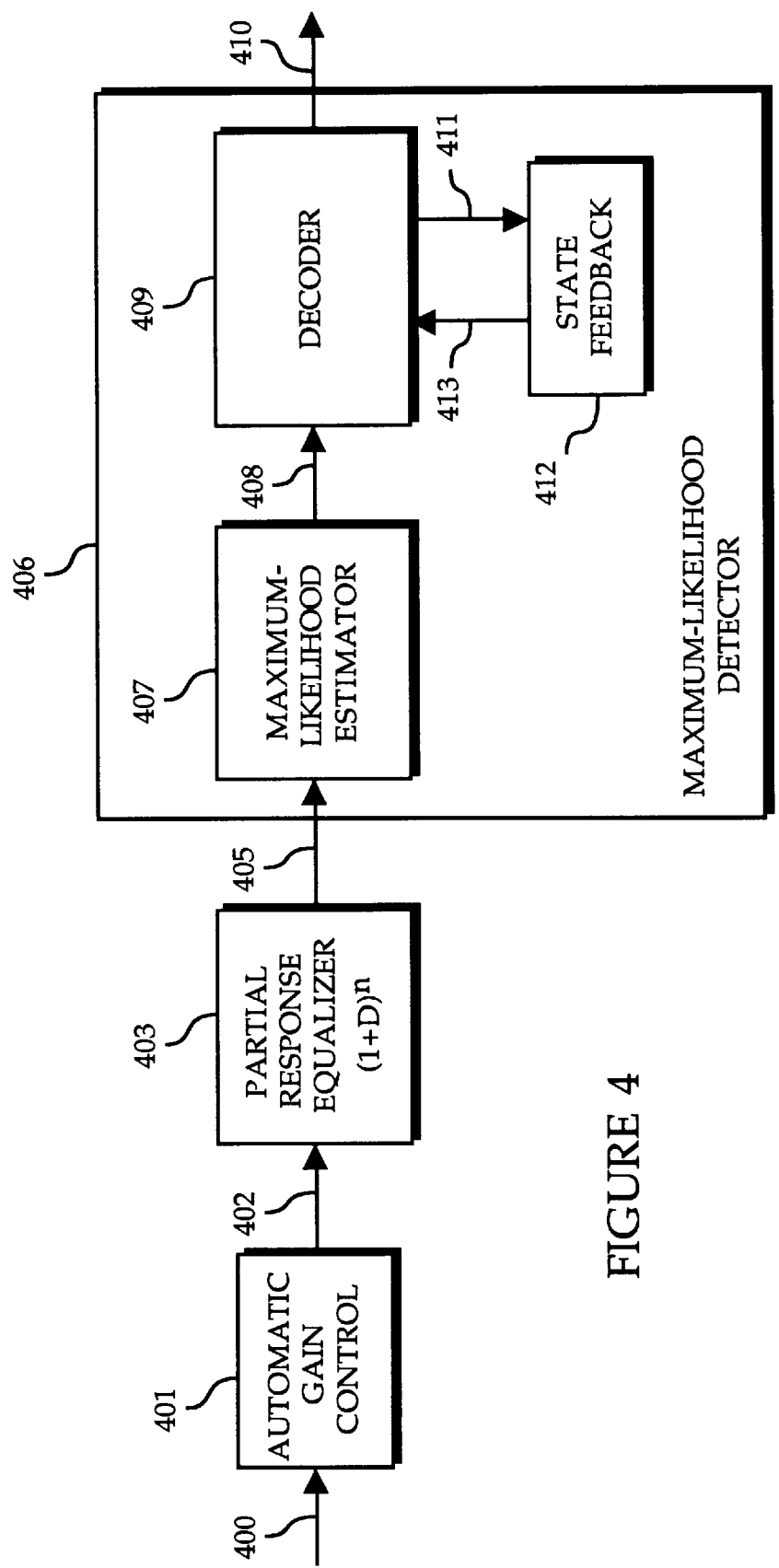
FIG. 4 is a simplified block diagram of a partial response (PR) detection channel.

FIG. 4 shows a block diagram of the PR channel. Automatic gain control (AGC) amplifier 401 sets the input signal amplitude so that input signal 400 is sampled at preset levels. AGC amplifier 401 provides the gain control signal 402 to PR equalizer 403. Signal 402 comprises Lorentzian pulses generated from signal transitions, such as those in a magnetic read channel. PR equalizer 403 equalizes the signal to the desired partial response waveform, performing pulse slimming on the input waveform by providing high frequency boost. Ideally, equalized signal 405 generated by PR equalizer 403 contains pulses whose sample values conform to expected waveform values. Signal 405 is provided to maximum-likelihood (ML) estimator 407 within ML detector 406.

Within ML detector 406, ML estimator 407 processes the sample values through a set of decision functions to generate a set of detection values, or metrics, labeled as signal 408. These detection values are provided to decoder 409 for comparison with state dependent detection threshold values. Decoder 409 determines the detected data value and provides the detected data as output signal 410. Concurrently, decoder 409 provides update signal 411 to state feedback block 412 to update the detection state of the decoder. State feedback block 412 provides the new state as signal 413 to decoder 409 for use in determining the detection thresholds for the next set of detection values 408.

Figure 8:
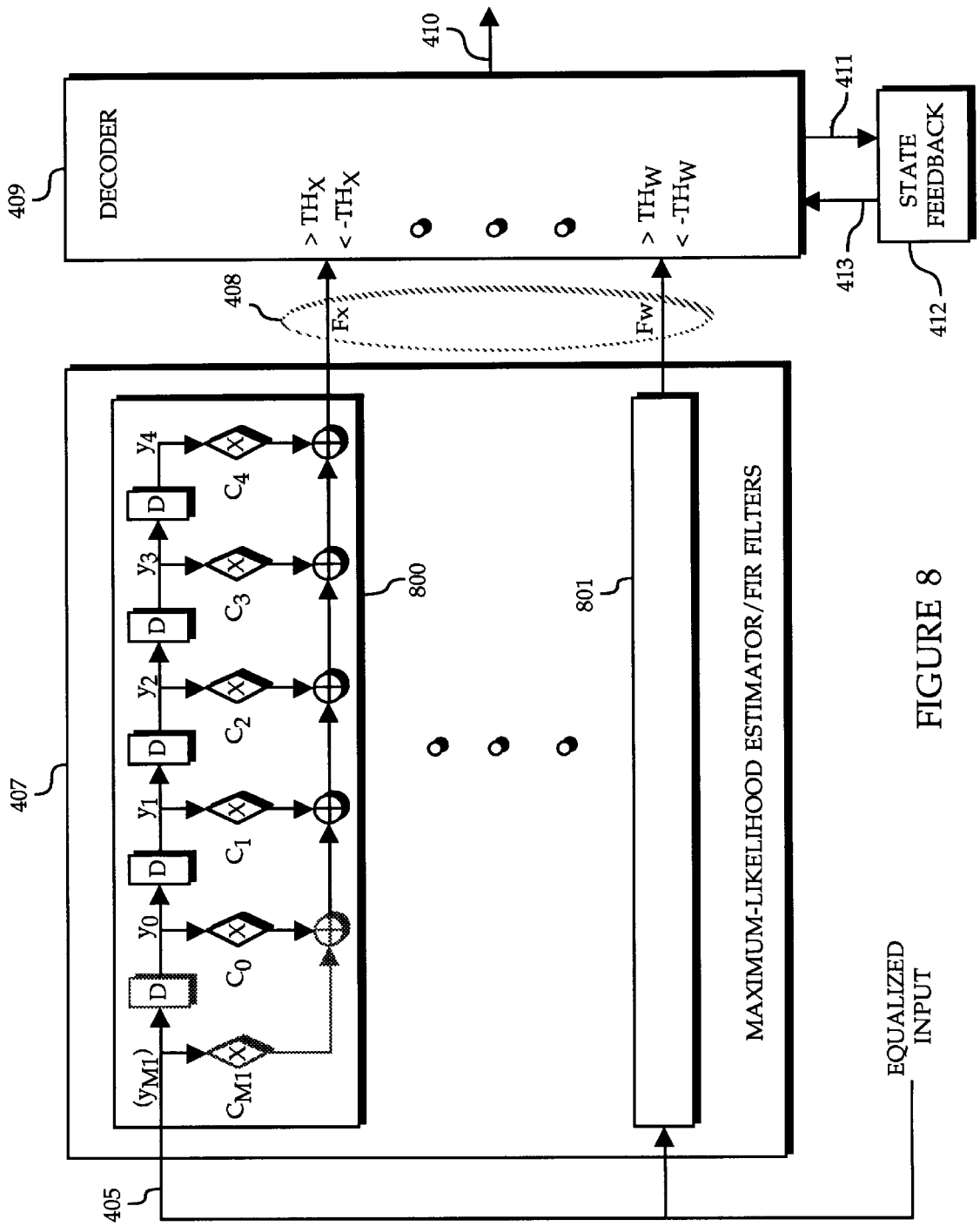
FIG. 8 is a block diagram of a ML detector comprising FIR transversal filters.

FIG. 8 illustrates a ML detector wherein the ML estimator comprises several FIR filters used to provide the linear decision functions, Fx, Fy, etc. As shown, the equalized signal 405 is provided to the input of each FIR filter (800 and 801 shown). The outputs of these filters, labeled Fx and Fw, make up signal 408 which is provided to decoder 409. Within decoder 409, each value in signal 408 is compared with a state determined threshold. Further, a sign inversion is performed between positive phase and negative phase comparison operations.

Each linear decision function in ML estimator 407 may be implemented as shown for FIR filter 800. A tapped delay line provides successive samples of the input, $y_0$ through $y_4$. Each tap is multiplied by a coefficient value, $C_0$ through $C_4$, respectively. Some of these coefficient values may be zero. After multiplication by the respective coefficients, the tapped signals are summed to provide the decision function estimate, e.g., Fx. An extra delay element and coefficient multiplier $C_{M1}$ are shown to indicate the optional inclusion of a look-back sample in the decision function of some embodiments.

ML detector 406 consists of several function calculators embodied in ML estimator 407, and several comparators and a state machine embodied in decoder 409 and state feedback block 412. The transition rules between states of the state machine depend upon the logic results of comparisons between the function values of the data samples and certain state-dependent thresholds. Because there are four non-zero samples in the equalized response of a single transition, four bits are required to represent the state of decoder 409. The state of the decoder is defined as the last four binary logic levels of the detected signal current, and is stored in state feedback block 412. Because of this format, state feedback block 412 can be implemented with a four-bit shift register. The four bits can represent up to sixteen states.

Figure 3:
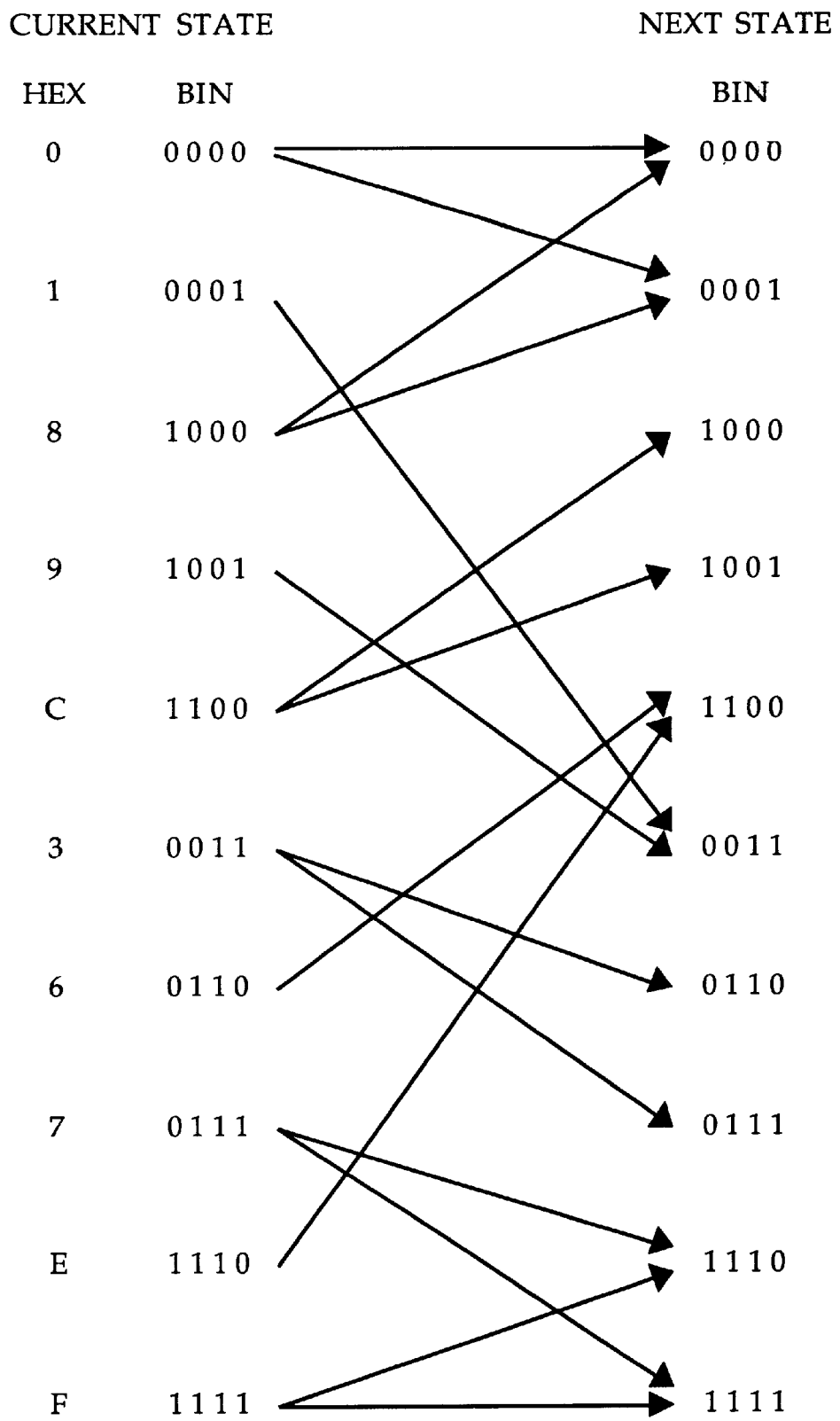
FIG. 3 is a trellis state diagram for a (1,7) RLL coded EEPR4 look-ahead ML detector.

For a (1,7) RLL code EEPR4 channel, there are ten legitimate NRZ (non-return-to-zero) states as shown in FIG. 3, wherein each transition indicates a transition from "0" to "1," or vice versa. However, due to the (1,7) RLL coding minimum for transition spacing, only six of the states require a decision to determine their next transition state and the decoded data. For example, state "0001" can only progress to state "0011." States "0010," "0100," "0101," "1010," "1011," and "1101" are invalid NRZ states for (1,7) RLL coding.

The task of ML decoder 409 is to determine whether a peak exists between clock cycle 1 and 2, which in turn determines the next state. FIG. 5 describes the decoding algorithm for the detector. ML estimator 407 first computes the results of several linear functions (Fa, Fx, Fy and Fw) with the sample values $y_0$, $y_1$, $y_2$, $y_3$ and $y_4$, and, in one embodiment, look-back value $y_{M1}$. The results of these functions are compared with an equal number of state-dependent thresholds in decoder 409. The logic results of these comparisons are assigned to the decision variables, A, X, Y and W. Based on the values of these decision variables and the current state, $a_0 b_0 c_0 d_0$, the decoder determines what the next state and the decoded data are, according to the rules in FIG. 6. The decisions for states 0001, 1001, 1110 and 0110 are not given in FIG. 5 because their next state is constrained by the (1,7) coding scheme.

Sample value $y_2$ does not appear in equations [4] and [5] because it is common to both the signal and the minimum distance error waveform (as shown in FIG. 1). Thus, including the $y_2$ sample would not increase the detection threshold, but would increase the total additive white Gaussian noise (AWGN) by adding the noise of another sample. However, the $y_2$ sample does affect the noise correlation and the noise bandwidth. Therefore, including $y_2$ in the ML estimator for the apparatus of the present invention improves the detector performance.

Further, a "look-back" sample ($y_{M1}$) can be included as well to help cancel noise correlation. This look-back sample can also compensate for non-ideal equalization where the actual sample value is non-ideal (e.g., not zero). If $y_{M1}$ is included, the four data state threshold feedback is optimally increased to set the proper comparator thresholds. The trellis diagram of FIG. 3 increases from ten states to sixteen states, which is equivalent to increasing the partial response order to $E^3 PR4$.

In FIG. 5, function Fa is a baseline checking function. It determines whether the sample values represent a signal that exceeds the minimum magnitude threshold needed to indicate a peak caused by a transition. Spurious peaks due to noise in the channel are thus ignored. Function Fa must be true if a peak is to be detected.

Functions Fx, Fy and Fw are responsible for determining whether the sample values fit a predetermined peak model.

Fx performs a test for satisfaction of minimum conditions to distinguish a peak from the nearest valid sample model which does not form a peak. Fy performs the same test as Fx, but with a more stringent threshold value. Thus, for Fy to be true, the sample model must be sufficiently close to an ideal peak model so as to differentiate it from any other possible combination. Even a peak distorted by a subsequent peak will not pass this strict test.

Fw tests for sample combinations typical for a peak distorted by nearby peaks. Thus, for an undistorted peak, Fx and Fy will be true, and for a peak distorted due to a nearby transition, Fx and Fw will be true. Therefore, the resulting "peak detected" binary decision is A & X & (Y+W). If this binary decision is true, then a transition will be indicated at the output and in the state machine, unless such a transition is prohibited by the (1,7) coding.

The decoded data indicates whether there is a transition at clock cycle zero, that is, whether there is a transition from state bit $c_1$ (note, $c_1=d_0$) to state bit $d_1$. This decoded data is compatible with most of the (1,7) RLL decoders. The threshold values listed in FIG. 5 are considered nominal for an ideal isolated EEPR4 pulse that is "normalized" to have the sampled sequence value of 0, 1, 3, 3, 1, 0. Performance can be improved by fine-tuning these thresholds to give maximum margins in all conditions. This tuning could reduce the effect of non-ideal equalization.

$y_i$ denotes the sampled signal value at the ith clock cycle, and $a_i b_i c_i d_i$ represents the state of decoder 409, where $a_i$, $b_i$, $c_i$, $d_i$ are the last four binary logic levels of the data. In the following description, yo represents the current sample value that is being decoded, corresponding to the clock cycle i=0. $y_1$, $y_2$, $y_3$ and $y_4$ are four look-ahead samples. aobocodo represents the current state of the decoder and $a_1 b_1 c_1 d_1$ is the next state. From the state value $a_0 b_0 c_0 d_0$, decoder 409 determines what the next state and the decoded data are, according to the rules in FIG. 6. A phase check function is not shown. If a wrong polarity signal is detected, the detector is reset to look for the proper phase.

As previously described, a set of FIR filters maximizes the detection threshold between all possible signal waveform patterns and their minimum distance error waveforms. The weighted sum outputs of the FIR filters are compared to a set of thresholds decided by the previously detected data to make the decision for the current detection. The use of the previously detected data is analogous to the operation that occurs in a decision feedback equalized detector (DFE). In fact, the detector performance approaches that of fixed delay tree search (FDTS) with decision feedback. The advantage of a PR channel over a DFE is that it is easier and less complicated to equalize to a PR target shaped pulse than to remove ISI. The disadvantage of PR is that its equalization correlates noise.

The FIR filter coefficient values effect the number of thresholds and hence the detector complexity. Coefficient values also affect the complexity of a digital implementation. For example, multiplying by 0.5 is accomplished with a digital shift operation, and multiplying by 0.75 is accomplished with two shift operations and an add operation. The number of equations may also affect the complexity. These constraints are considered during the optimization of the coefficient values by, for instance, confining the allowable coefficient combinations under consideration to those meeting the constraints.

Figure 9:
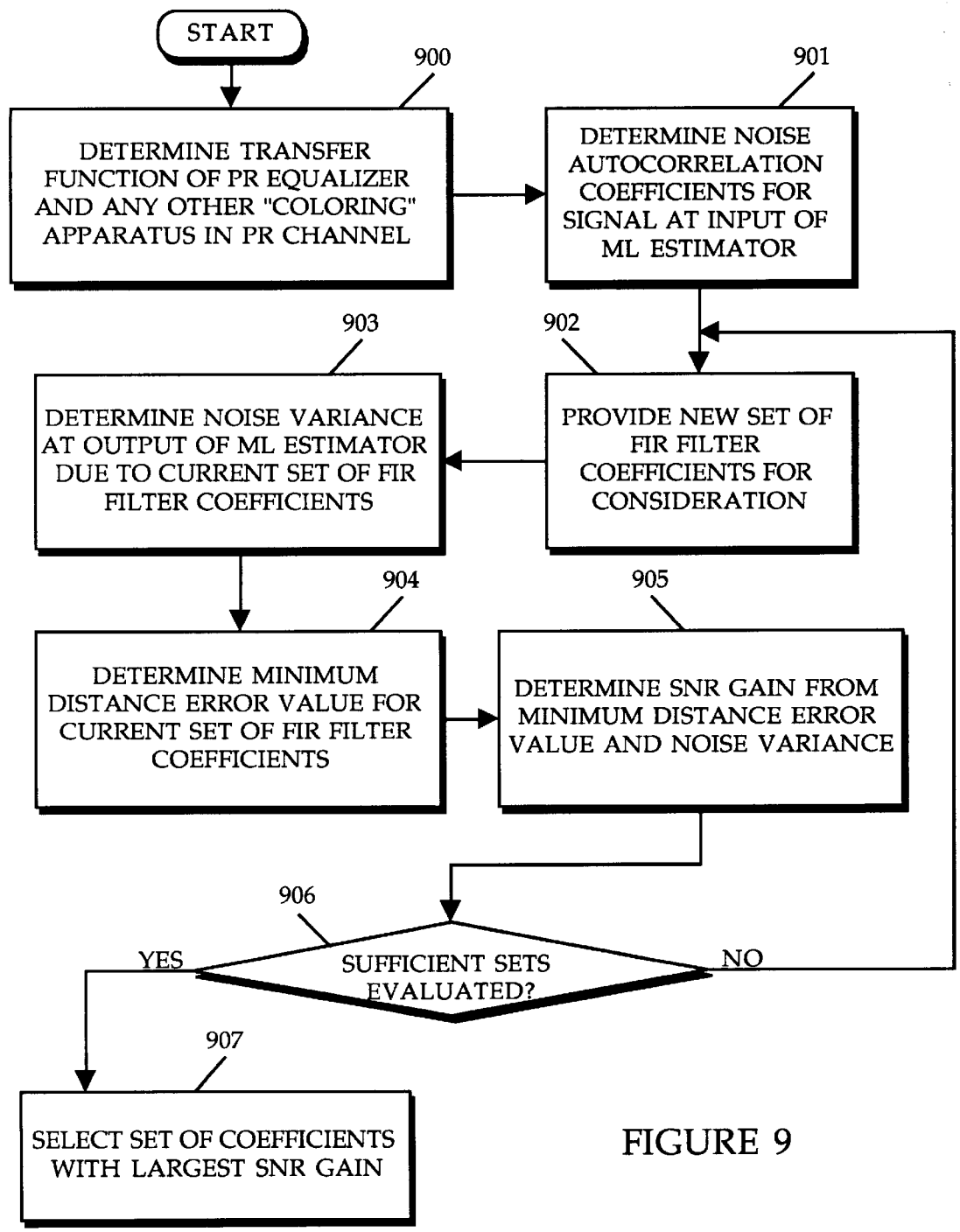
FIG. 9 is a flow diagram of a method for optimizing a ML estimator in the presence of colored noise.

The optimization of the FIR filter coefficients of ML estimator 407 is illustrated in the flow diagram of FIG. 9. The optimum coefficients are achieved by maximizing the signal-to-noise ratio (SNR) at the output of the ML estimator FIR filters individually. The signal value is represented by the minimum distance error value for the respective FIR filter, whereas the noise value is represented by the square root of the noise variance at the output of the FIR filter. Both of these elements, the signal value and the noise value, are functions of the FIR filter coefficients. Whereas the signal value may be calculated directly, determination of the noise variance requires analysis of the PR channel frequency response.

In block 900 of FIG. 9, the transfer function of the PR channel, including elements between the input of the Lorentzian pulse and the output of the target PR pulse, is determined. Once the transfer function of the PR channel is determined, in block 901, for the required user density, the noise autocorrelation coefficients are calculated from the equalized noise power density (i.e., the power spectrum of white noise filtered by the transfer function required to shape the Lorentzian pulse into a targeted PR pulse). In block 902, using either an exhaustive search or qualified selection process (e.g., a search limited to coefficient values requiring only shift and add functions, etc.), a set of coefficients is selected for analysis.

In blocks 903 and 904, in any order, the noise variance at the output of the ML estimator and the minimum distance error value are calculated using the selected set of coefficients. Next, an SNR gain value is determined from the minimum distance error value and the noise variance value in block 905. If, in subsequent block 906, sufficient coefficient sets have been analyzed, the set of coefficients providing the largest SNR gain value is selected in block 907. If further coefficient combinations remain to be analyzed, the process returns to block 902.

The autocorrelation coefficients require that the variance of the noise power spectrum $\sigma^2$ and the noise autocorrelation function $\Phi(t)$ be calculated. The derivation of $\sigma^2$ and $\Phi(t)$ follows. The Lorentzian pulse spectrum is given by the following equation:

$$E(\omega) = \left(\frac{\pi PW_{50}}{2}\right) e^{-\frac{\omega PW_{50}}{2}} \qquad [7]$$

and the ideal equalized wave spectrum from the partial response equalizer is given by:

$$G(\omega) = Ts(1+D)^n = Ts(1+e^{-j\omega Ts})^n \qquad [8]$$

where $\omega$ is the frequency, $PW_{50}$ is the pulse-width at fifty percent magnitude, and Ts is the sample period of the waveform.

Applying equations [7] and [8] to the additive white Gaussian noise at the input of the PR channel, the spectral density of the colored noise at the output of the PR equalizer is:

$$N(\omega) = No \left|\frac{G(\omega)}{E(\omega)}\right|^2 = No \left|\frac{2Ts}{\pi PW_{50}} e^{\frac{\omega PW_{50}}{2}} (1+e^{-j\omega Ts})^n\right|^2 \qquad [9]$$

The variance of the noise power density at the input of the ML estimator is derived from the above equation as follows:

$$\sigma^2 = \qquad [10]$$

-continued $$\frac{1}{2\pi}\int_0^\pi N(\omega)d\omega = \frac{1}{2\pi}\int_0^{\frac{\pi}{T_s}} No \left| \frac{2T_s}{\pi PW_{50}} e^{-\frac{\omega PW_{50}}{2}} (1 + e^{-j\omega T_s})^n \right|^2 d\omega$$

where $\pi/T_s$ is the bandwidth of $G(\omega)/E(\omega)$. The variance integral can be reduced to the following summation:

$$\sigma^2 = \frac{4No}{\pi^3 T_s K} \sum_{i=0}^{n} \delta_i \frac{(-1)^i e^{\pi K} - 1}{K^2 + i^2} \qquad [11]$$

where for n=0 (dicode), $\delta_0$=0.5;
for n=1 (PR4), $\delta_0$=1, $d_1$=1;
for n=2 (EPR4), $\delta_0$=3, $\delta_1$=4, $\delta_2$=1; and
for n=3 (EEPR4), $\delta_0$=10, $\delta_1$=15, $\delta_2$=6, $\delta_3$=1, and
where K=$PW_{50}/T_s$. For the (1,7) RLL code wherein the sample period or code period, Ts, is equal to two-thirds of the output NRZ data period (i.e. 2/3 bits per symbol), K is equal to 1.5 times Du, the user density.

The noise autocorrelation function is given by the following inverse Fourier transform integral:

$$\Phi(t) = \frac{1}{2\pi}\int_0^\pi N(\omega)e^{j\omega t}d\omega = \qquad [12]$$

$$\frac{No}{2\pi}\int_0^{\frac{\pi}{T_s}} \left| \frac{2T_s}{\pi PW_{50}} e^{-\frac{\omega PW_{50}}{2}} (1 + e^{-j\omega T_s})^n \right|^2 e^{j\omega t}d\omega$$

which can be solved to obtain the following summation:

$$\Phi(t) = \frac{2No}{T_s \pi^3 K^2} \sum_{i=0}^{n} \delta_1 \left[ \frac{e^{\pi K}(K\cos\pi T_1 + T_1 \sin\pi T_1) - K}{K^2 + T_1^2} + \frac{e^{\pi K}(K\cos\pi T_2 + T_2 \sin\pi T_2) - K}{K^2 + T_2^2} \right] \qquad [13]$$

where $T_1$=[(t/Ts)+i], and $T_2$=[(t/Ts)−i]. The autocorrelation coefficients are obtained from equations [11] and [13] by dividing the autocorrelation function by the variance of the noise power density, $\rho(t)=\Phi(t)/\sigma^2$.

From the autocorrelation coefficients and the variance of the colored noise signal at the input of the ML detector, the noise variance at the output of each decision function is calculated based on the FIR coefficients of the respective decisions. The noise variance at the output of the FIR filter is given by:

$$VAR\left[\sum_{i=-1}^{n} c_i N_i\right] = \sum_{i=-1}^{n}\sum_{j=-1}^{n} COV[c_i N_i, c_j N_j] \qquad [14]$$

$$= \sum_{i=-1}^{n}\sum_{j=-1}^{n} c_i c_j COV[N_i, N_j]$$

$$= \sum_{i=-1}^{n}\sum_{j=-1}^{n} c_i c_j \sigma^2 \rho(|i-j|T_s)$$

$$= \sigma^2 \left[\sum_{i=-1}^{n} c_i^2 + 2\sum_{i=0}^{n}\sum_{j=-1}^{i-1} c_i c_j \rho((i-j)T_s)\right]$$

where $\sigma^2$ is the noise variance prior to the FIR filter, $\rho(t)$ is the autocorrelation coefficient at time "t," and $c_i$ is the FIR filter coefficient for the $i^{th}$ sample. The FIR filter is of sample length "n," but the range of "i" begins at "−1" to include the look-back sample ($c_{M1} Y_{M1}$) of one embodiment. Without a look-back sample, the range for "i" is between zero and "n." The signal-to-noise gain obtained by altering the FIR coefficient values can be measured by calculating the ratio of the minimum distance error, $d_{MIN}$, divided by the square root of the noise variance at the FIR filter output.

$$SNR = \frac{d_{MIN}(Fx)}{\sqrt{VAR}} \qquad [15]$$

where $$d_{MIN}(Fx) = |Fx(S1) - Fx(S2)| = \sqrt{\sum_{i=-1}^{n} c_i^2 (y_{i,S1} - y_{i,S2})^2} \qquad [16]$$

and S1 and S2 are pulse signal waveforms for a minimum distance event. For relative comparison of SNR values, multiplicative constants (e.g., $\sigma^2$ in VAR) can be ignored.

A larger value of $d_{MIN}$ signifies larger separation between minimum distance signal waveforms, providing more robust decisions. A smaller value of noise variance signifies a lower probability that a false detection will occur due to noise for a given $d_{MIN}(Fx)$. Therefore, by maximizing the SNR value above, performance of the ML detector is optimized.

Because the number of coefficient values is large for the determination of a maximum SNR value through derivatives, it is more straightforward to perform a computer search for the optimal set of coefficients. A computer search program defining the range of coefficient values and the desired step sizes can evaluate the SNRs for a large number of coefficient combinations quickly and accurately. The best combination of coefficients thus determined is then implemented in the FIR filters of the ML estimator. Examples of programs for accomplishing this type of search are provided as Appendix 1 and Appendix 2, where the routine of Appendix 1 determines autocorrelation coefficients, and the routine of Appendix 2 determines the SNR values. The maximum SNR value can be determined from the SNR values using a software sorting routine, or by reviewing the list of SNR values manually.

For $D_u$ ranging from 1.5 to 3.0, a five-sample or six-sample ML look-ahead detector with optimized coefficients approaches or outperforms Viterbi detectors, especially in the higher user density range. The detector performance can be optimized at a given $D_u$. However, if a fixed set of coefficients is optimized for $D_u$=2.0, the SNR performance is virtually the same as that for a Viterbi detector for $D_u$ ranging from 1.6 to 3.0. If the look-ahead samples are increased, detector performance will improve. Also, the detector linear equation coefficients can be optimized to compensate for noise coloring from sources other than partial response equalization.

Several variations of performance versus look-ahead sample length and linear equation complexity are presented in FIG. 7. FIG. 7 shows detector signal-to-noise (S/N) gain versus $D_u$ when a Lorentzian pulse shape is ideally equalized to EEPR4. The gain of an ideal Viterbi Detector is shown as a reference for the other detector arrangements. At $D_u$=0, the noise is AWGN.

Detector I is a five sample, three equation look-ahead detector optimized for AWGN. Detector II adds the $y_2$ sample to compensate for correlated noise. $y_2$ improves its performance by 0.56 dB at $D_u$=2.0 and by 0.64 dB at Du=2.5. Detector III is a more complex five sample, three equation look-ahead detector whose performance is within 0.3 dB of an ideal Viterbi detector for $D_u$ ranging from 1.5 to 2.5. Detector IV is a five sample, three equation detector that utilizes the lookback sample and sixteen states. Detector V is a five sample, four equation look-ahead detector whose performance exceeds the Viterbi detector over a wide range of $D_u$. Detector VI is a six sample, four equation detector with even greater potential performance improvement.

A sample computer routine in BASIC for generating autocorrelation coefficients is provided as Appendix 1. Further, a sample computer routine in BASIC for generating a list of signal-to-noise gain values is provided as Appendix 2.

Thus, a method and apparatus for reducing noise correlation in a partial response channel has been described.

---

APPENDIX 1

```
10 'Partial Response Noise Autocorrelation Coefficient
20 PI = 3.14159
30 'PR Selection
40 'N = 0     :A(0) = .5                                    'DICODE
50 'N = 1     :A(0) = 1    :A(1) = 1                         'PR4
60 'N = 2     :A(0) = 3    :A(1) = 4    :A(2) = 1            'EPR4
70 N = 3      :A(0) = 10   :A(1) = 15   :A(2) = 6   :A(3) = 1  'EEPR4
80 INPUT "K=";K :K2 = K*K
90 B = EXP(K*PI)
100 'Variance
110 V = 0
120 FOR I = 0 TO N
130 V = V + A(I)*2*(B*(K*COS(I*PI) + I*SIN(I*PI)) − K)/(K2 + I*I)
140 NEXT
150 'Autocorrelation Coefficient
160 INPUT "T=";T
170 P = 0
180 FOR I = 0 TO N
190 T1 = T + I:T2 = T-I
200 P = P + A(I)*(B*K*COS(T1*PI) − K + B*T1*SIN(T1*PI))/
(K2 + T1*T1)
210 P = P + A(I)*(B*K*COS(T2*PI) − K + B*T2*SIN(T2*PI))/
(K2 + T2*t2)
220 NEXT
230 PRINT P/V :GOTO 160
```

---

APPENDIX 2

```
10 '1,7 EEPR4 ML S/N Gain Search
20 'Five Sample Look-Ahead Channel With Colored Noise
30 'Ideal EQ Filter
40 '(Y0,Y1,Y2,Y3,Y4) = (A,B,C,D,E)
50 'Signal = (1,3,3,1,−1) − (0,1,3,2,−2) = (1,2,0,−1,1);S = A*A +
4*B*B + D*D + E*E
60 FOR A = .0 TO 1        STEP .1
70 FOR B = .5 TO 1.5      STEP .1
80 FOR C = −.5 TO 1.5     STEP .1
90 FOR D = −1 TO .0       STEP .1
100 FOR E = .5 TO 1.5     STEP .1
110 S = A*A + 4*B*B + D*D + E*E
120 R1 = .4826   :R2 = −.1722   :R3 = −.18    :R4 = −.0312
'Du = 1
130 V = A*A + B*B + C*C + D*D + E*E + 2*((A*B + B*C + C*D +
D*E)*R1 + (A*C + B*D + C*E)*R2 + (A*D + B*E)*R3 + A*E*R4)
140 SN1 = SQR(S)/SQR(V)
150 R1 = .2999   :R2 = −.3907   :R3 = −.1524   :R4 = .0324
'Du = 1.5
160 V = A*A + B*B + C*C + D*D + E*E + 2*((A*B + B*C + C*D +
D*E)*R1 + (A*C + B*D + C*E)*R2 + (A*D + B*E)*R3 + A*E*R4)
170 SN2 = SQR(S)/SQR(V)
180 R1 = .1077   :R2 = −.5348   :R3 = −.021   :R4 = .086
'Du = 2
190 V = A*A + B*B + C*C + D*D + E*E + 2*((A*B + B*C + C*D +
D*E)*R1 + (A*C + B*D + C*E)*R2 + (A*D + B*E)*R3 + A*E*R4)
200 SN3 = SQR(S)/SQR(V)
210 R1 = −.0726  :R2 = −.5852   :R3 = .1631   :R4 = .0787
'Du = 2.5
220 V = A*A + B*B + C*C + D*D + E*E + 2*((A*B + B*C + C*D +
D*E)*R1 + (A*C + B*D + C*E)*R2 + (A*D + B*E)*R3 + A*E*R4)
230 SN4 = SQR(S)/SQR(V)
```

-continued

APPENDIX 2

```
240 R1 = −.2286   :R2 = −.5547   :R3 = .3388   :R4 = .0003
'Du = 3
250 V = A*A + B*B + C*C + D*D + E*E + 2*((A*B + B*C + C*D +
D*E)*R1 + (A*C + B*D + C*E)*R2 + (A*D + B*E)*R3 + A*E*R4)
260 SN5 = SQR(S)/SQR(V)
270 PRINT USING "####.##";A;B;C;D;E;20*LOG(SN1)/LOG(10);
20*LOG(SN2)/LOG(10);20*LOG(SN3)/LOG(10);20*LOG(SN4)/
LOG(10);
20*LOG(SN5)/LOG(10)
280 NEXT:NEXT:NEXT:NEXT:NEXT
```

We claim:

1. A partial response channel comprising:
    an equalizer having a first frequency response for shaping an input pulse signal into a target pulse signal, said first frequency response coloring an additive noise component of said input pulse signal and generating a correlated noise component of said target pulse signal;
    a detector receiving said target pulse signal and providing a binary data signal, said detector comprising:
        a plurality of detection decision circuits receiving said target pulse signal and providing a plurality of decision values, wherein at least one of said plurality of detection decision circuits comprises a finite inpulse response (FIR) filter having a set of coefficients maximizing a signal-to-noise ratio;
        a decoder having a plurality of state dependent threshold values, said decoder providing said binary data signal based on comparisons between said plurality of decision values and said state dependent threshold values;
        wherein said signal-to-noise ratio comprises a minimum distance error value of said target pulse signal divided by a square root of a noise variance at an output of said FIR filter.

2. The apparatus of claim 1 wherein said FIR filter comprises a tapped delay line providing a plurality of tapped signals, each of said tapped signals being multiplied by a coefficient value from said set of coefficients to provide weighted signals, said weighted signals being summed to provide one of said decision values.

3. The apparatus of claim 1 wherein said first frequency response is a lowpass function with high frequency boost.

4. The apparatus of claim 1 wherein said decoder further comprises a state machine wherein a transition between a first state and a second state is dependent on said comparisons.

5. The apparatus of claim 1 wherein said binary data signal is run-length-limited (RLL) encoded.

6. The apparatus of claim 1 wherein said FIR filter has a second frequency response, said second frequency response whitening said correlated noise component of said target pulse signal.

7. The apparatus of claim 1 wherein said detector is a maximum-likelihood (ML) detector.

8. A method for reducing noise correlation in a partial response (PR) channel comprising a noise correlating element coupled to a detector, said detector further comprising a finite impulse response (FIR) filter coupled to a decoder, said method comprising the steps of:
    determining noise autocorrelation coefficients for a correlated noise signal at an input of said FIR filter;
    determining a plurality of noise variance values at an output of said FIR filter for a plurality of FIR coefficient combinations;

determining a plurality of minimum distance error values of said FIR filter for said plurality of FIR coefficient combinations;

utilizing an optimal coefficient combination from said plurality of FIR coefficient combinations which maximizes a signal-to-noise ratio (SNR), said SNR comprising a function of said minimum distance error value and said noise variance value for each of said plurality of FIR coefficient combinations;

wherein said SNR is determined for each FIR coefficient combination by dividing an associated minimum distance error value by a square root of said noise variance value.

9. The method of claim 8 wherein said step of determining said noise autocorrelation coefficients further comprises:

determining a variance of a noise power density of said correlated noise signal based on a transfer function of said noise correlating element;

dividing an autocorrelation function by said variance of said noise power density.

10. The method of claim 8 wherein said noise variance values are determined for a selected user density (Du).

11. The method of claim 8 wherein said plurality of FIR coefficient combinations are limited to coefficients requiring only shifts and adding operations.

* * * * *